(12) United States Patent  
Lieberman (10) Patent No.: US 7,965,413 B2
(45) Date of Patent: Jun. 21, 2011

(54) METHOD AND SYSTEM FOR DETECTION OF BINARY HALFTONE FREQUENCIES

(75) Inventor: David Jordan Lieberman, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1118 days.

(21) Appl. No.: 11/693,331

(22) Filed: Mar. 29, 2007

(65) Prior Publication Data
US 2008/0239342 A1    Oct. 2, 2008

(51) Int. Cl.
*G06F 15/00* (2006.01)
*G06K 1/00* (2006.01)
*H04N 1/60* (2006.01)
*H04N 1/405* (2006.01)

(52) U.S. Cl. ........................ 358/1.9; 358/3.06
(58) Field of Classification Search ............ 358/1.9, 358/3.02–3.06, 3.09
See application file for complete search history.

(56) References Cited

U.S. PATENT DOCUMENTS

| | | | |
|---|---|---|---|
| 4,194,221 A | 3/1980 | Stoeffel | |
| 4,811,115 A | 3/1989 | Lin et al. | |
| 5,327,262 A | 7/1994 | Williams | |
| 5,434,953 A | 7/1995 | Bloomberg | |
| 5,765,029 A | 6/1998 | Schweid et al. | |
| 5,778,156 A | 7/1998 | Schweid et al. | |
| 5,850,474 A | 12/1998 | Fan et al. | |
| 5,852,678 A | 12/1998 | Shiau et al. | |
| 6,181,829 B1 | 1/2001 | Clark et al. | |
| 6,185,328 B1 | 2/2001 | Shiau | |
| 6,229,923 B1 | 5/2001 | Williams et al. | |
| 6,240,205 B1 | 5/2001 | Fan et al. | |
| 6,263,086 B1 * | 7/2001 | Wang | 382/100 |
| 6,347,153 B1 | 2/2002 | Triplett et al. | |
| 6,549,658 B1 | 4/2003 | Schweid et al. | |
| 6,983,076 B2 | 1/2006 | Curry et al. | |
| 2004/0114185 A1 | 6/2004 | Shiau et al. | |

FOREIGN PATENT DOCUMENTS

EP    0521662    9/1998

* cited by examiner

*Primary Examiner* — Douglas Q Tran
(74) *Attorney, Agent, or Firm* — Michael J. Nickerson; Basch & Nickerson LLP (57) ABSTRACT

A method and system detects a halftone frequency. A digitized image is received. An autocorrelation function is performed upon the digitized image to generate an autocorrelation function value for each halftone frequency of a predetermined set of possible halftone frequencies. A demerit term for each possible halftone frequency, based upon the autocorrelation function value, is calculated. A halftone frequency from a predetermined set of possible halftone frequencies, based upon the calculated demerit terms, is selected.

22 Claims, 12 Drawing Sheets

| HALFTONE FREQUENCY | LENGTH (L) | S1 | S2 | S3 | FAST-SCAN PERIOD SPOTS (600 DPI) |
|---|---|---|---|---|---|
| 85 | 30 | [5,0] | [6,0] | [10,0] | 10 |
| 106 | 24 | [4,0] | [8,0] | [12,0] | 8 |
| 125 | 24 | [6,0] | [8,0] | [12,0] | 6 |
| 141 | 24 | [6,0] | [8,0] | [12,0] | 6 |
| 134A | 30 | [4,-2] | [6,2] | [10,0] | 10 |
| 134B | 30 | [4,2] | [6,-2] | [10,0] | 10 |
| 156 | 30 | [5,0] | [8,0] | [10,0] | 5 |
| 212 | 24 | [2,0] | [4,0] | [6,0] | 4 |

| HALFTONE FREQUENCY | MINIMUM DE-SCREEN SIZE* | DE-SCREEN SIZE USED* | HALFTONE DEPENDENT WEIGHT | DESIRED SCALE FACTOR† | APPROXIMATE SCALE FACTOR |
|---|---|---|---|---|---|
| 85 | [10,5] | [30,4] | 1 | 127/480 | 1/4 + 1/64 |
| 106 | [8,4] | [24,4] | 1 | 127/384 | 1/4 + 1/16 + 1/64 |
| 125 | [6,4] | [24,4] | 1 | 127/384 | 1/4 + 1/16 + 1/64 |
| 141 | [6,3] | [24,3] | 1/2 | 127/288 | 1/4 + 1/8 + 1/16 |
| 134A | [10,2] | [30,4] | 1 | 127/480 | 1/4 + 1/64 |
| 134B | [10,2] | [30,4] | 1 | 127/480 | 1/4 + 1/64 |
| 156 | [5,3] | [30,3] | 1/2 | 127/360 | 1/4 + 1/16 + 1/32 + 1/128 |
| 212 | [4,2] | [24,4] | 1 | 127/384 | 1/4 + 1/16 + 1/64 |

* LISTED IN UNITS OF: [600 DPI PIXELS, SCAN-LINES]
† MULTIPLICATIVE FACTOR NEEDED TO SCALE VALUES INTO AN 8-BIT RESULT

*FIG. 11*

METHOD AND SYSTEM FOR DETECTION OF BINARY HALFTONE FREQUENCIES

BACKGROUND AND SUMMARY

Digital multifunction reprographic systems have grown in sophistication and function. Digital multifunction reprographic systems include a variety of options to improve the image quality of output documents and in addition they are often used in networked environments. The improved image processing means that a variety of halftones and tone response curves may be applied to the data to be printed.

The networked environment makes it possible for a document to be RIPed at one machine and printed on another, remote, machine. The document to be printed is often rasterized into a binary representation of the pages to be printed before transmission to the remote machine.

In such a case where the document is binarized at one location and printed remotely, the remote machine would produce higher quality pictorials had it been able to use the proper tone response curve for each halftone that is applied to the document. If this information is not supplied with the binary document representation, it would be desirable for the remote machine to be able to reliably identify the halftones present in the document to be printed. This identification is required in order to accommodate a subsequent halftone frequency dependent tone response curve adjustment.

In another application, customers might choose to adjust the appearance of a printed document with a change in the darkness or contrast level. To achieve consistent results across a range of possible halftone frequency candidates, a distinctly different tone response adjustment curve is needed; one for each supported halftone frequency candidate.

In another application, customers might choose to adjust the appearance of a printed document with a different level of change in text and halftone pictorial areas. To darken or lighten text without adjusting pictorials, adjust pictorials only, or to darken one while lightening another (or to a different degree), identifying pictorial from text and line-art is a necessary first step.

Therefore, it is desirable to provide a real-time imbedded halftone frequency detection algorithm to distinguish between a series of distinct halftone frequencies of interest and text when there is no tag plane available to identify these to the print engine.

BRIEF DESCRIPTION OF THE DRAWING

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Figure 1A:
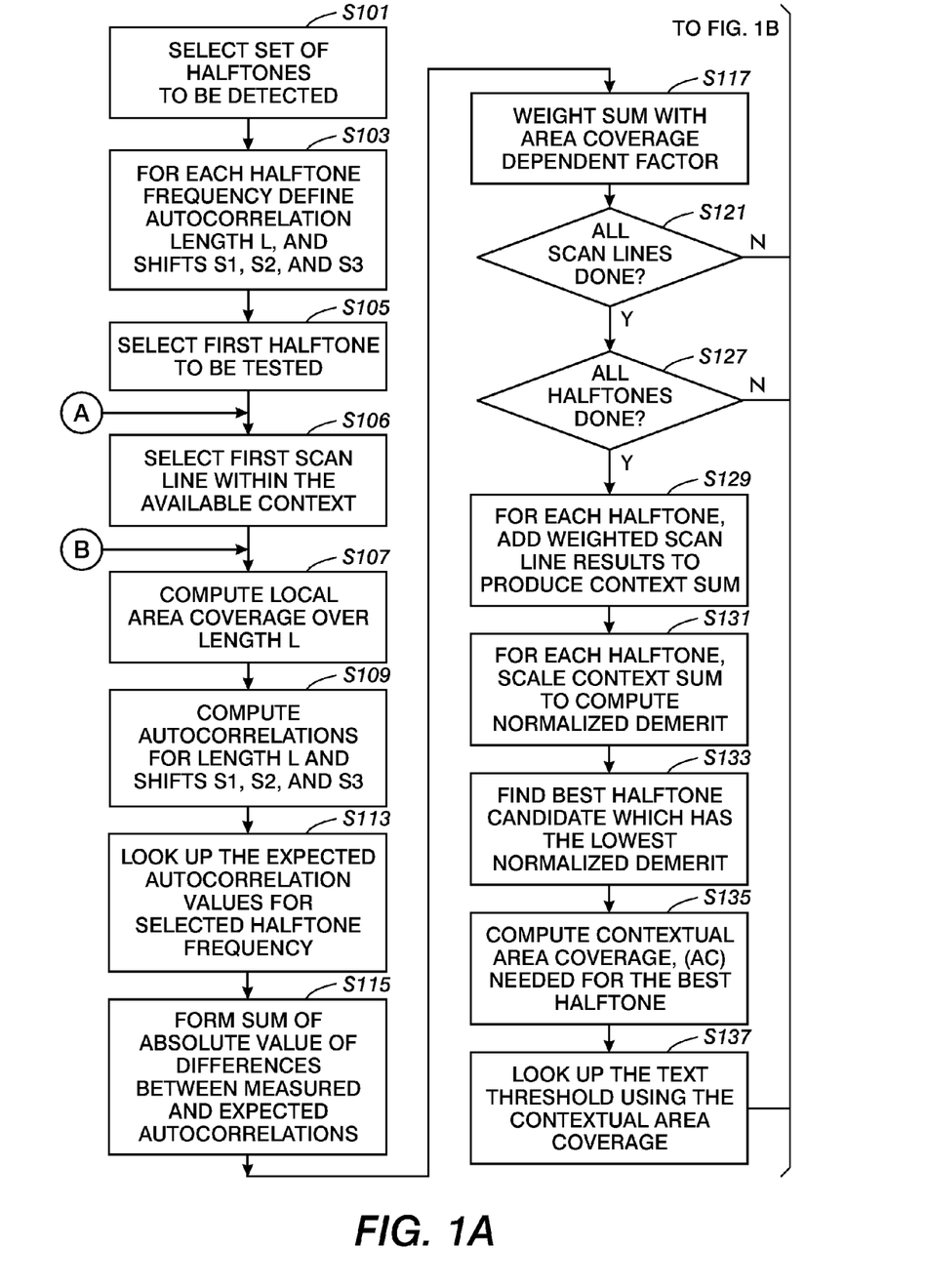
FIG. 1 illustrates a flow chart showing a method of determining which of a set of halftones is present at a given position in a document.
Figure 1B:
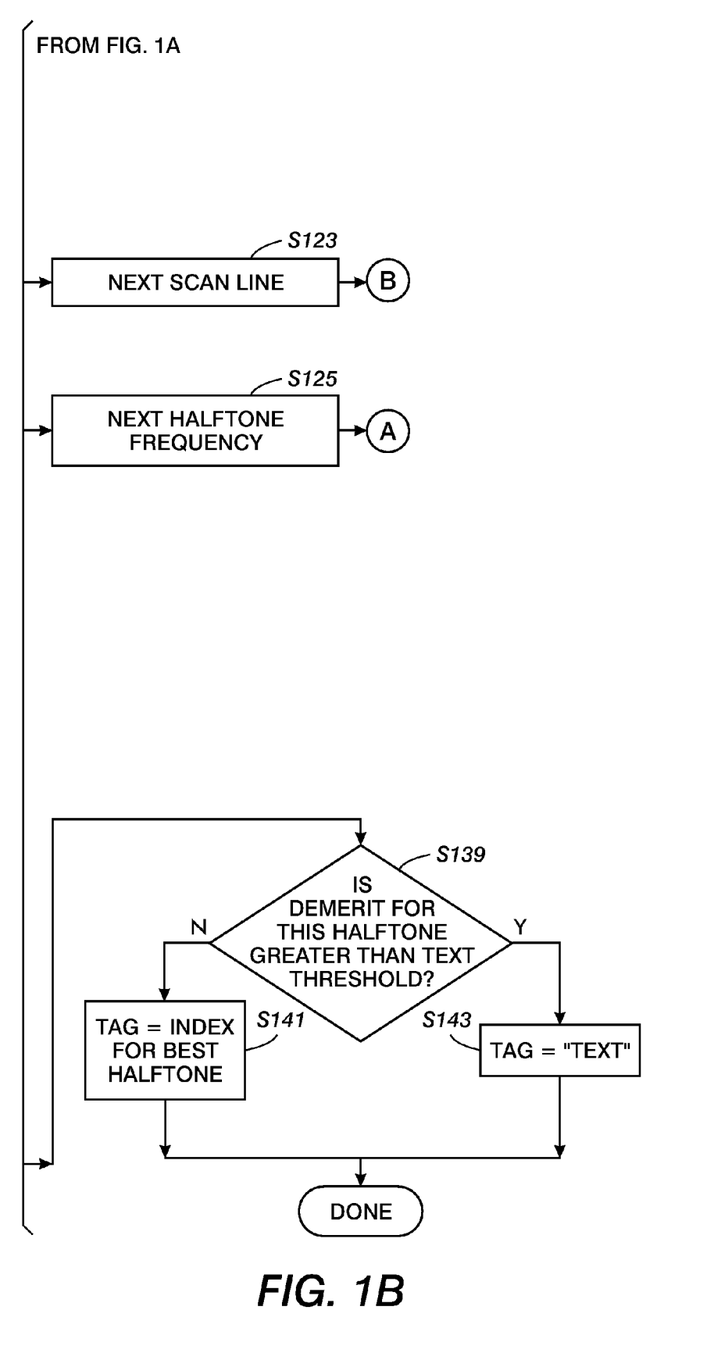

FIG. 1 illustrates a flow chart of a method for determining, at each pixel location in a binary representation of a document, which one of a set of halftones is being used. It is to be understood that the process described in FIG. 1 is to be repeated for each pixel in the page image being tested, and that the result of the process is the generation of an additional tag pixel plane to the page image, where the tag pixel plane contains a value at each position that identifies the halftone frequency at the corresponding pixel in the actual page image plane. In addition to the set of halftone frequencies to be tested, there is the additional possibility that the pixel under test may be part of text or line art which may be adjusted differently than any halftone area.

Starting is step S101, the set of halftones to be tested is defined. This step needs to be done only once, at the time the system is designed and is assumed fixed. In step S103, for each halftone, a set of autocorrelation parameters are defined. This set of parameters includes an autocorrelation length, L, and three shift parameters, S1, S2, and S3. Each halftone can have unique values for L, S1, S2, and S3, or some of them may be common. The method of choosing these parameters will be discussed below. At step S105, the actual detection process begins by picking one of the halftones as the first halftone to be tested.

At least one scan-line interval of context centered upon the pixel under test is required. In the preferred embodiment a context which includes a plurality of scan-line intervals centered about the pixel under test is available for processing. The individual scan-line based results are combined to produce a context-based metric. An optimal configuration would employ enough scan-lines to accurately de-screen the all of the halftones to be detected. In step S106, the first available scan-line to operate upon is selected.

At step S107, a local area coverage function is computed over the autocorrelation length L. This function is a simple sum of the binary pixel values over the range of L pixels centered on the pixel being tested. The area coverage function AC[n] at pixel n is given by:

$$AC^{(L)}[n] = \sum_{\vec{k}=n-\lceil L/2 \rceil}^{n-\lceil L/2 \rceil + L - 1} p[\vec{k}]$$

where p[k] is the pixel value (0 or 1) at pixel location k. In this equation, the pixels may be at a symmetric resolution, say 600×600 spi. This technique is extensible to high addressable systems wherein a plurality of H consecutive high addressable pixels replaces each symmetric pixel. In such a case the equation for AC[n] should be modified by simply replacing the term L with the product H*L, where H is the high addressability multiple.

In step S109, three values of the autocorrelation function are computed for each of the three shift parameters S1, S2, and S3. Using more than one value of the shift parameter makes a significant improvement in being able to distinguish different halftone frequencies. Each halftone frequency corresponds to a unique shift and length dependent autocorrelation signature. Detecting this signature is equivalent to sampling the output of a matched filtering operation, an optimal detection scheme. When two of the selected sets of halftones are harmonically related, this differentiation ability is particularly useful.

It is noted that rather than computing the normal autocorrelation function defined by:

$$R_{pp}[\vec{m}] = \sum_{\vec{k}=-\infty}^{\infty} p[\vec{k}] * p[\vec{k} + \vec{m}]$$

where the autocorrelation can be computed using simpler expression, as described in U.S. Pat. No. 4,811,115:

$$R'_{pp}[\vec{m}] = \sum_{\vec{k}=-\infty}^{\infty} |p[\vec{k}] - p[\vec{k} + \vec{m}]|$$

which is computationally more efficient. The entire content of U.S. Pat. No. 4,811,115 is hereby incorporated by reference.

However, in this variation of the autocorrelation function has a minimum rather than a maximum when the shift corresponds to a multiple of the halftone lattice period, and it has a maximum rather than a minimum when the shift is an odd multiple of ½ of the halftone period. To be brief, this variation of the autocorrelation function will henceforth be referred to as an autocorrelation function.

For binary images, the absolute value of the difference in the sum is either 0 or 1. An even simpler and more efficient method of computing the autocorrelation function is to use the exclusive-or (XOR) of the two pixels making the computation:

$$X_{S_c}^L[n] = \sum_{c=first}^{last} p[c] \wedge p[c + S_c]$$

where first=n−$\lceil L/2 \rceil$−$\lceil S_c/2 \rceil$, last=first+L−1 and $\lceil \ \rceil$ is the ceiling operation and $S_c$ is a shift factor.

This form of the autocorrelation function computation is also amenable to a recursive implementation in an application specific integrated chip, as will be described below.

An aspect of the autocorrelation function is that its value depends on the area coverage, that is the fraction of the area that is covered with "1" pixels. As illustrated in FIG. 1, in step S113, the area coverage computed in step S107 is used to index into a look-up-table to determine the expected autocorrelation function value.

In step S113, the expected value of the autocorrelation functions is indexed for each value of the shift parameter, taking into account the measured area coverage. These values form a prediction, and by comparing each measured value of the autocorrelation function with its prediction, a measure of the difference is determined, assuming a given halftone is present. This difference is a measure of error between the values corresponding to the assumed halftone frequency and the computed correlation signature present at the pixel under consideration. These errors are now used in step S115 where the absolute value of the difference between the computed and predicted correlation values is determined for each of the three shift parameters.

Figure 3:
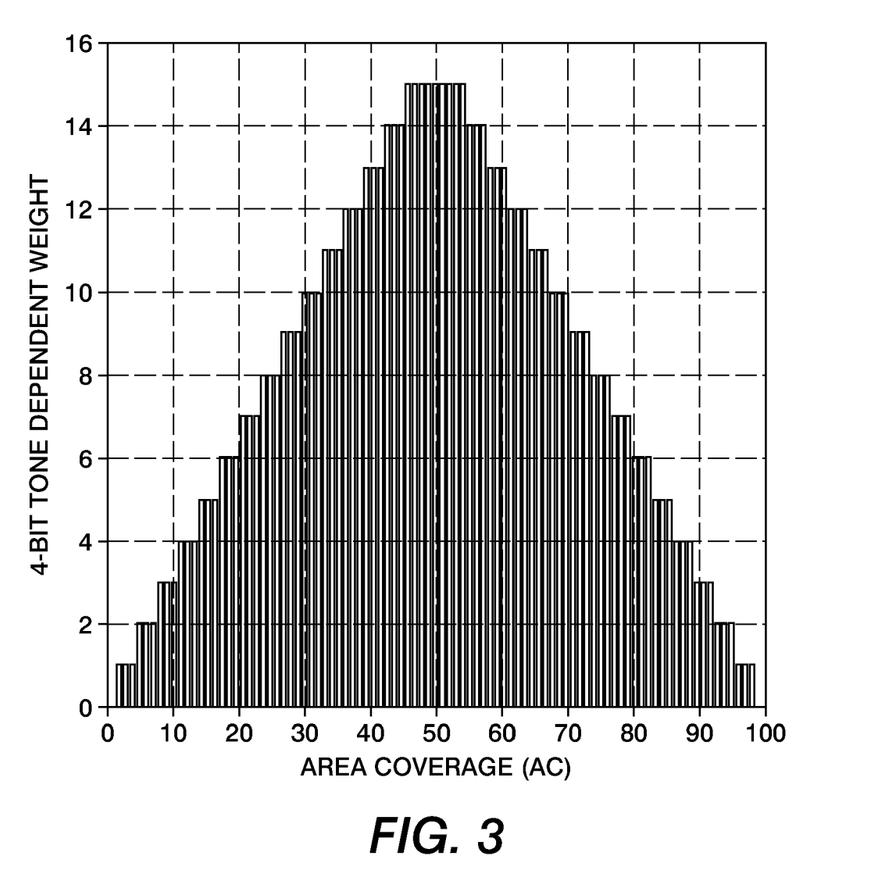
FIG. 3 illustrates a weighing function to properly weight the autocorrelation computed for different area coverages.

In step S115, the sum of the computed differences from step S113 is formed for that scan line, and in step S117, the sum is multiplied by an area coverage dependent weight which is indexed by the area coverage computed in step S107. This weighting allows individual scan line based results to be combined into a more robust signal-to-noise normalized context based sum. At extreme levels of tone, correlation values are very small, and the signal-to-noise ratio is low. A graph of the expected signal to noise ratio as a function of area coverage is illustrated in FIG. 3. At mid-tone, the correlation values are very significant and the signal-to-noise ratio is at a maximum. These results should be weighted by their expected signal-to-noise ratio to produce an optimal context based result. This weighted sum is saved until the entire set of halftone frequencies for each and every scan line available within the context are processed and will then be used to identify the most likely value of the halftone frequency present at the pixel under consideration.

If there are remaining scan lines in the contest that need processing, then step S121 chooses to perform step S123 wherein selects the next scan line to be evaluated and processing loops back to point B. If all scan lines in the context have been evaluated then step S121 instead proceeds to step S127 where a check is made to see if all potential halftone frequency candidates have been checked. If this is not the case, then in step S125 the next halftone frequency is selected and processing is returned to point A.

Figure 11:
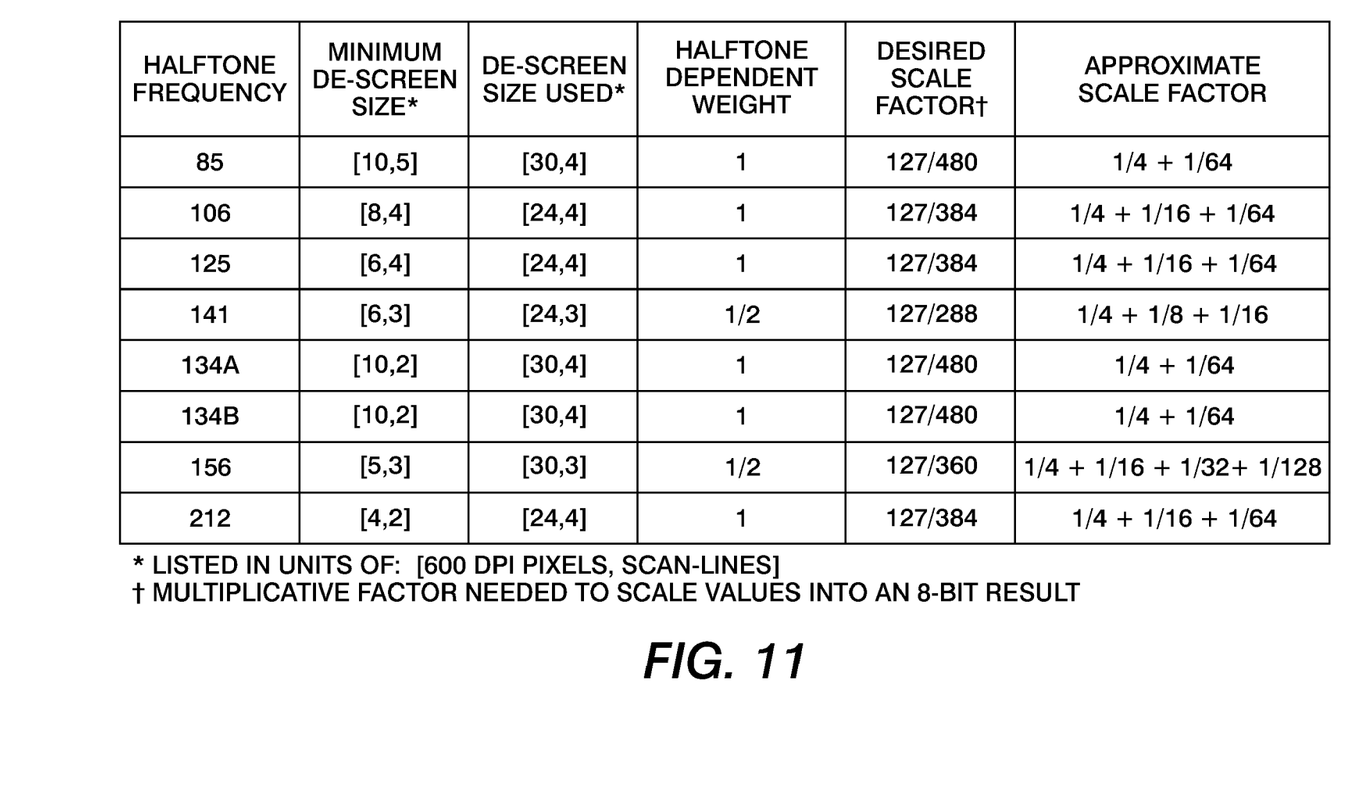
FIG. 11 shows the set of halftone frequencies and the corresponding screen size, weights, and scale factors used to compute the normalized demerit function values.

In another aspect of the context-based correlation calculation metric, the context based sum will have a dynamic range that depends on the length parameter L, and the number of scan lines that are used to de-screen each assumed halftone under consideration. Halftones that require fewer scan lines for de-screening and shorter L values would have weighted context based sums with a smaller dynamic range. This is an undesirable bias that needs to be eliminated by using final context based normalization. For each halftone frequency under consideration, the desired normalization factor is listed in FIG. 11. After normalization, each and every halftone frequency would have its own assigned metric with the exact same 7-bit dynamic range. To reduce computational complexity, the scale factor was approximated by a term that could be implemented using a few shifts and adds. The ideal and approximate scale factors age given in FIG. 11. These factors have been determined empirically to minimize the chance of a mismatch. In general it has been found that the method of determining these weights is not very sensitive to the method used to compute them; most methods give results that compare closely to the coefficients that constitute a matched filter for the halftone frequencies under test.

If all scan lines have been processed, the weighted scan line results are added in step S129 into a context based metric. Then that context demerit is weighted for each halftone to compute a normalized demerit value in step S131.

The lowest normalized demerit function is determined in step S133. The halftone frequency with the lowest demerit function value is selected. However, we must consider the possibility that the current pixel is not part of a halftoned area, but is part of a text/line-art region. Now that the best halftone candidate is known, the most appropriate local area coverage estimate is computed in step S135. Ideally, this area coverage estimate is the descreened area coverage where the descreening cell matches the expected halftone. In step S137, area coverage is used to index into a pre-computed look-up-table to determine the maximum acceptable demerit limit. This limit is used as a threshold in step S139. If the demerit value of the best halftone is less than the threshold, in step S141 a tag value for this pixel is set to the value corresponding to the halftone identified as having the lowest normalized demerit function. If the demerit function is greater than the threshold value, the tag is set to the value indicative of text/line-art in step S1143.

Figure 2:
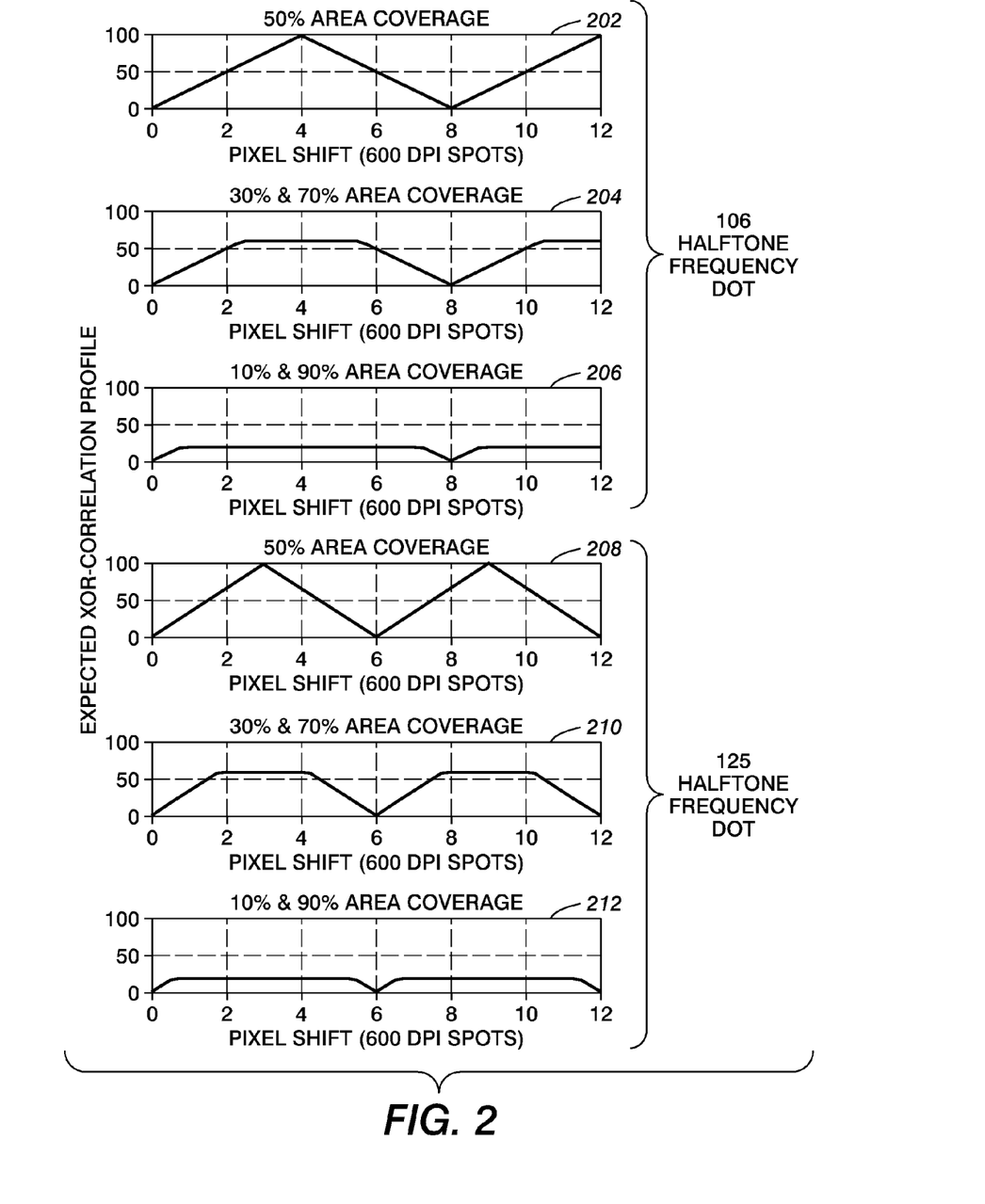
FIG. 2 illustrates the dependence of the autocorrelation function upon the local area coverage for two different halftone frequencies.

FIG. 2 shows the XOR autocorrelation function for two different halftones as a function of the shift. Plots 202, 204, and 206 show the XOR-ACF for a halftone dot of frequency 106 dpi at area coverage levels of 50%, 30% and 70%, and 10% and 90%, respectively. Note that the XOR ACF will be symmetrical about an area coverage value of 50% since the correlation can be enhanced if both pixels in the XOR function are "1" or if both pixels in the XOR function are "0". That is if the dark areas match or equivalently if the light areas (or holes) match, the autocorrelation will be smaller than if only parts of the compared areas match.

Plots 208, 210, and 212 show plots for the autocorrelation function for a halftone of 125 dpi frequency at area coverages of 50%, 30% and 70%, and 10% and 90%, respectively. It should also be noted that the location of the valleys of the autocorrelation function for any given halftone frequency are not dependent on the area coverage. However, the magnitude and width of the peaks of the autocorrelation function for a given halftone are dependent on the area coverage.

FIG. 3 shows a form of the weighing function. This triangular weighing function defines a 4-bit value that can be used to weight the autocorrelation function, giving more weight to area coverages near 50% where the signal-to-noise ratio is highest. By giving more weight to area coverages near 50%, where the signal to noise ratio, defined as the ratio of the maximum of the autocorrelation function to its minimum, is maximum, the chance of improperly identifying the halftone frequency is reduced. The jagged form of the function reflects that only discrete levels (a binary system) are utilized by the measured area coverage function.

Figure 4:
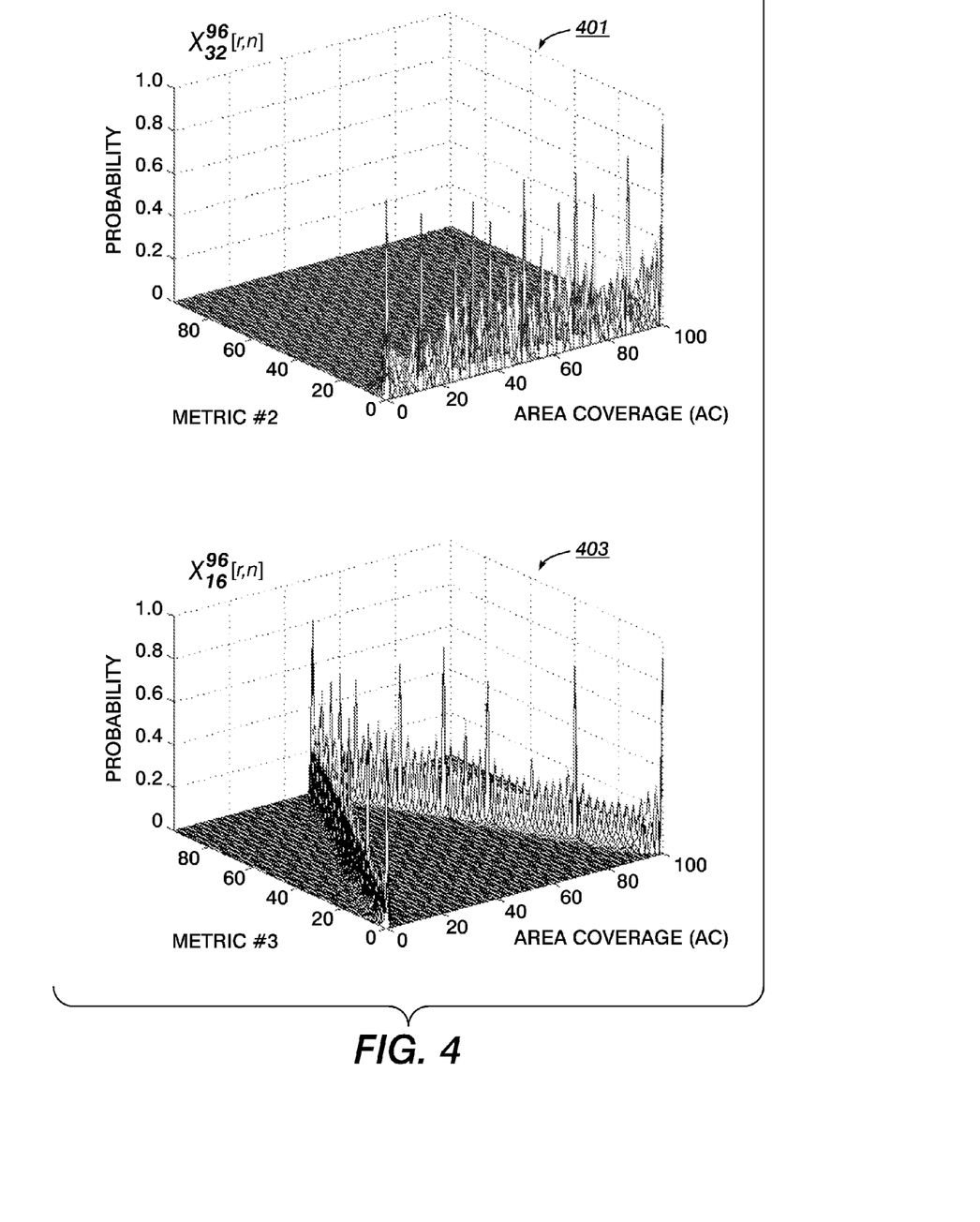
FIG. 4 illustrates the sampled joint probability distributions for area coverage and autocorrelation value measured from a set of actual documents.

FIG. 4 shows a plot of the probability distributions of the autocorrelation functions measured from a collection of halftoned documents. Plot 401 on the left, shows the autocorrelation values for a shift of 32 pixels corresponding to 8×600 dpi spots which is 1 period of the 106 dpi halftone that was used on documents. The area coverage is plotted along one axis, the autocorrelation function values are plotted along the other axis, and the third (vertical) dimension is the value of the probability of finding that particular combination of autocorrelation function value and area coverage. The probability function values show that this length and shift combination consistently generates an autocorrelation valley at all levels of area coverage for this halftone frequency. This behavior is expected for the XOR autocorrelation function, because in the case of the shift corresponding to the halftone frequency a near perfect match is expected resulting in an XOR value of 0.

In contrast, plot 403 on the right, which is a similar plot to plot 401, shows the probability distribution for a shift of 16 pixels, corresponding to 4×600dpi spots or ½ of a period of the 106 dpi halftone dot used in the documents. Again, the XOR autocorrelation function is expected to be at a maximum since there is a nearly opposite phase with a ½ period shift and depends on area coverage. That is with a shift of ½ period, the maximum number of "1" pixels and "0" pixels autocorrelation matches will occur and the this maximum number depends on the area coverage.

Figure 5:
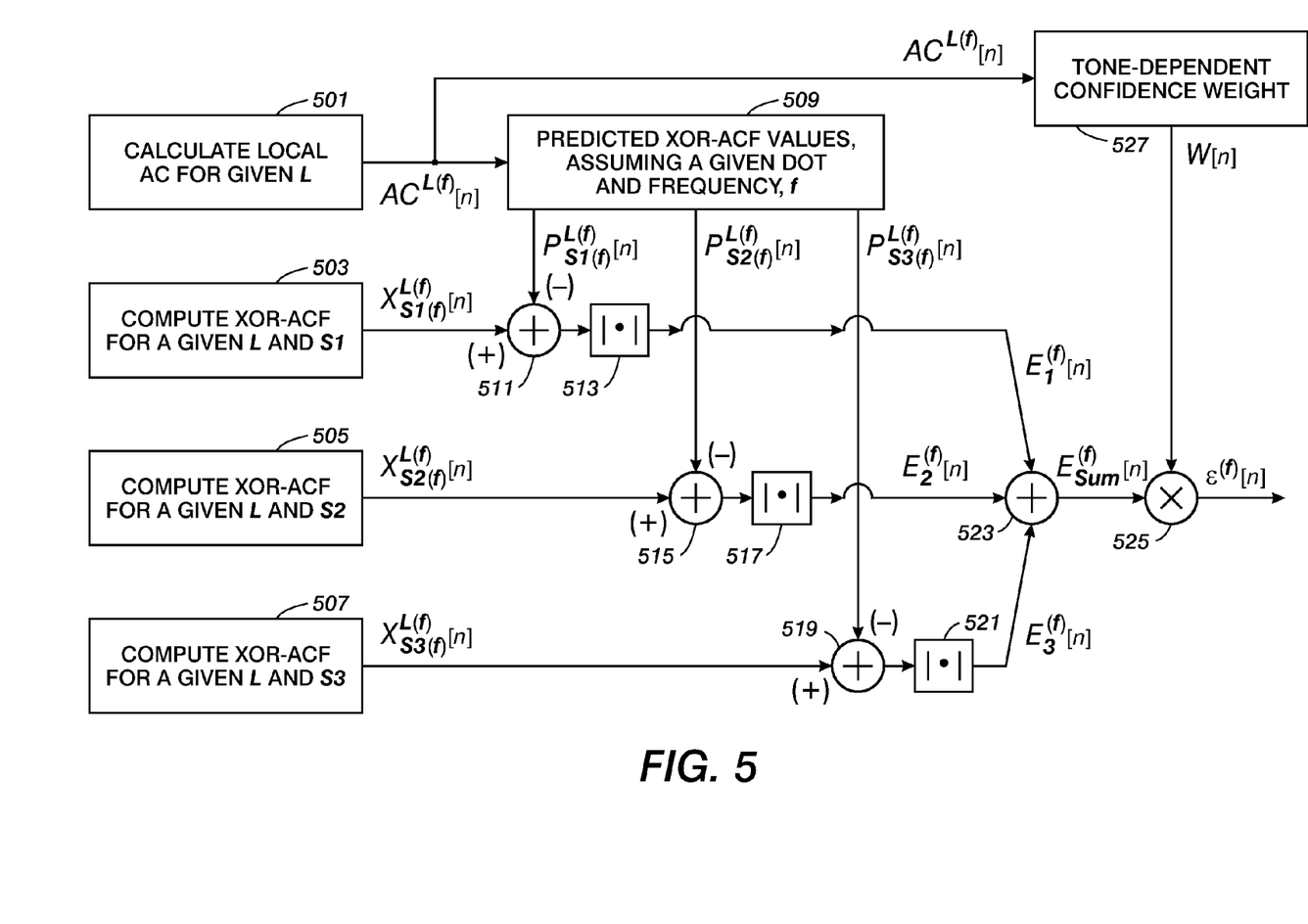
FIG. 5 illustrates the computation of a demerit function for a particular halftone candidate.

FIG. 5 shows, in a different form, the computations carried out in steps S107-S117 of FIG. 1. In local area coverage calculation circuit 501, the local area coverage is computed for the length interval, L, for the frequency being tested. In XOR-autocorrelation function circuit 503, n XOR-autocorrelation is carried out using the length L and the shift parameter S1. Similarly in XOR-autocorrelation function circuit 505, an XOR-autocorrelation is computed using the length L and the shift parameter S2, and in XOR-autocorrelation function circuit 507, an XOR-autocorrelation is computed using the length L and the shift parameter S3.

The output of the local area coverage calculation, from local area coverage calculation circuit 501, is fed to XOR-autocorrelation function prediction look-up-table 509 where the predicted XOR-autocorrelation function is output for each of the shift factors S1, S2, and S3. These three predictions are fed to the negative input of a summing circuit, summing circuit 511 for S1, summing circuit 515 for S2, and summing circuit 519 for S3. The output of the measured XOR-autocorrelation for each shift value is fed to the positive input of the summing circuits. The measured value for S1 is fed to summing circuit 511, the value for shift S2 is fed to summing circuit 515, and the value for shift S3 is fed to summing circuit 519.

The output of each summing circuit is passed through absolute value circuit 513 for the S1 difference, absolute value circuit 517 for the S2 difference, and absolute value circuit 521 for the S3 difference. The absolute values of the three differences are then summed by summing circuit 523. This scan-line demerit measure should be scaled by a tone dependent weight as illustrated in FIG. 3. The area coverage signal from local area coverage calculation circuit 501 is passed to weighting look-up-table 527 where the local area coverage tone-dependent weighting factor is output. This factor is multiplied with the sum of the three absolute value differences at multiplier 525. The output of multiplier 525 is the weighted scan line demerit function value for the frequency being tested.

Figure 6:
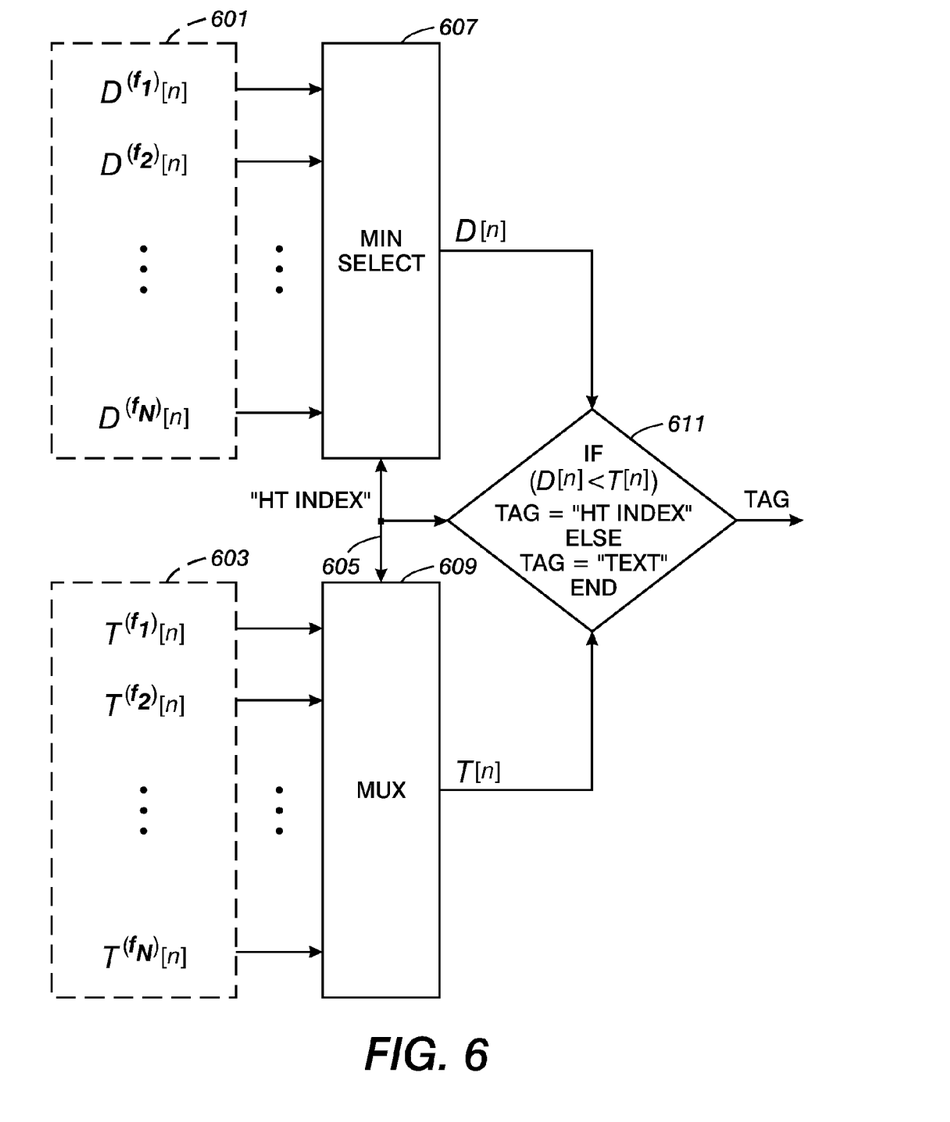
FIG. 6 illustrates the process of selecting the best estimate of the local halftone frequency using the demerit function computed in FIG. 5.

FIG. 6 shows the selection process that identifies the best estimate of the halftone present as performed in steps S125 through S131 of FIG. 1. The demerit function values, 601, from all frequencies being tested are fed to minimum selector 607. The minimum selector 607 finds the demerit value with the lowest value, which corresponds to the best estimate of the halftone frequency present at the pixel under test. For each demerit function value a corresponding threshold is output for 703 to produce a collection of threshold values 603. The index of this frequency, 605, is used to select the threshold value from the set of threshold values, 603, that were computed for each frequency tested. The selected demerit value is compared to the selected threshold value in block 611. If the demerit is less than the threshold, the halftone index is passed as the output of the detector. If the demerit value is greater than the threshold, a "text/line-art" tag is output. The output of the detector is used to build the aforementioned tag plane.

The preceding discussion assumed that all computation takes place along one scan line, although this is not a limitation. Indeed if a two dimensional context is available, one or more of the shift parameters S1, S2 and S3 may correspond to a two-dimensional shift. Furthermore, if there is a two dimensional context available, the identification of the best halftone value can be improved by using the weighted scan line demerit function values from more than one scan line of the image.

Figure 7:
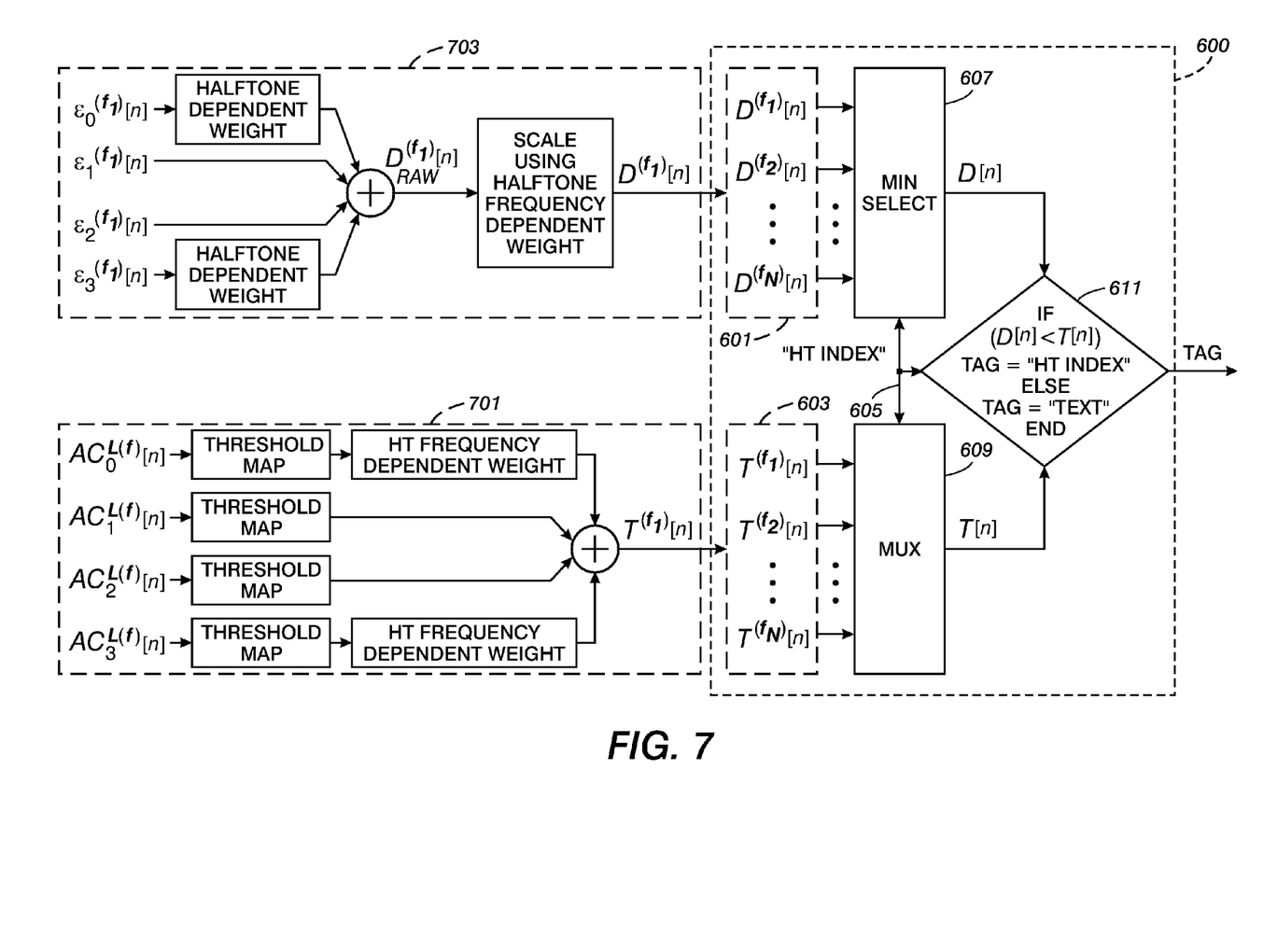
FIG. 7 illustrates a modification of the selection process of FIG. 6 when more than one scan line of data is available.

FIG. 7 shows how the selection process of FIG. 5 is modified to include multiple scan lines of context. If more than one scan line of context is available, the error values from several scan lines are summed for each frequency by summer circuit 703. In the preferred embodiment, the number of scan lines available is sufficient to de-screen the halftones to be detected. This removes the potential for inaccuracy by beating with the patterns in the halftone to produce disproportionate results. These halftone dependent weights are used if the de-screening cell corresponding to given halftone weights scan lines differently. These halftone dependent weights are used in 703 and tabulated in FIG. 11. In addition, after the final halftone tag is determined, these weights are absorbed into the final normalized local area coverage estimate computed in FIG. 11. Similarly, the threshold values are mapped and summed in threshold circuit 701. These combined values are then passed to the detection block 600 of FIG. 6.

Due to the varying sizes of the de-screening cell and halftone dependent weights, and to the distinct values of parameter L, the maximum demerit value for different halftone frequencies could vary. This variation is undesirable because it provides an advantage to some halftones and disadvantage to others. To avoid this bias, a final normalization is performed to the content dependent demerit. The normalization weights for the halftones under test are given in FIG. 11 and they are applied to the Demerit in 703.

In summary, the halftone detection procedure can be performed using a series of XOR-autocorrelation function calculations with a specific combination of width and shift, accompanied by prediction, absolute error calculation, and tone-dependent weighting, as discussed above. Specifically, at each pixel index [n], one demerit value is evaluated for each halftone frequency under consideration. For example, possibly halftone frequencies include the 85, 106, 125, 134, 156, and 212 halftone dots.

The normalized demerit values are compared, and the halftone dot corresponding to the lowest normalized demerit value (below a minimum acceptability threshold) is considered an indication of the presence of the corresponding halftone frequency at the pixel index under test. The scale factors used to normalize the demerits are both halftone frequency and tone dependent. In addition, the minimum acceptability threshold is also tone dependent. If no normalized demerit values are below this (tone dependent) threshold, the pixel is assigned a text/line-art classification.

An example of the procedure for computing a given demerit value will be discussed below.

First, a given halftone dot is assumed to be present at the pixel index under test. Based upon this assumption, a demerit is generated. Moreover, a halftone frequency dependent interval length L(f) is selected, where L(f) is an integer multiple of the assumed halftone period. This period depends on the halftone frequency f, as indicated by the notation.

The local area coverage is computed over the interval as well as three XOR-autocorrelation function values, using the selected shift parameters S1(f), S2(f), and S3(f), which depend on the halftone frequency f. For the collection of halftones under consideration, these parameters are selected to minimize classification error.

The local area coverage value is used to index a predicted (expected) XOR-autocorrelation function values. The absolute difference between the expected and computed value is an error term. This absolute difference is calculated for each of the three XOR-autocorrelation function calculations which are summed to generate a single demerit value per scan line. The significance of this sum, a single demerit value, is tone dependent. The local area coverage value is used to index the weight used to scale the demerit in accordance with it's expected signal-to-noise ratio. Thus, a tone-dependent weight is applied to the sum, resulting in a weighted demerit metric term.

It is noted that this demerit metric term can be computed over a number of scanline intervals that are centered upon (or just above or below) the pixel under test. For example, if four scanlines of context are available, four weighted scanline demerit terms contribute. This sum is then weighted to produce the normalized demerit value.

The demerit metric term $\epsilon^{(f)}[n]$ is used to determine the halftone frequency of the pixel under test. Since this is a demerit error metric, the highest likelihood ratio is associated with a normalized demerit value that is smaller than all other demerits, thereby classifying the pixel as having the halftone corresponding to the minimum normalized demerit.

As noted above, ideally, halftone detection should be performed over a large two-dimensional window of context surrounding the pixel under test. However, by measuring fast-scan periodicity, a two-dimensional periodicity lattice can be effectively inferred. To reinforce the confidence level in the fast-scan periodicity estimate, the demerits from a predetermined number of consecutive scanlines can be combined to into one demerit-sum function. This sum should be weighted to produce the normalized demerit-sum function.

In addition, each scanline interval provides a distinct tone-dependent threshold contribution. These thresholds are combined into one threshold-sum. If a given normalized demerit-sum is lower than all other demerit sums, and it is also lower than the threshold-sum, the pixel under test is classified as having the corresponding halftone.

Figure 8:
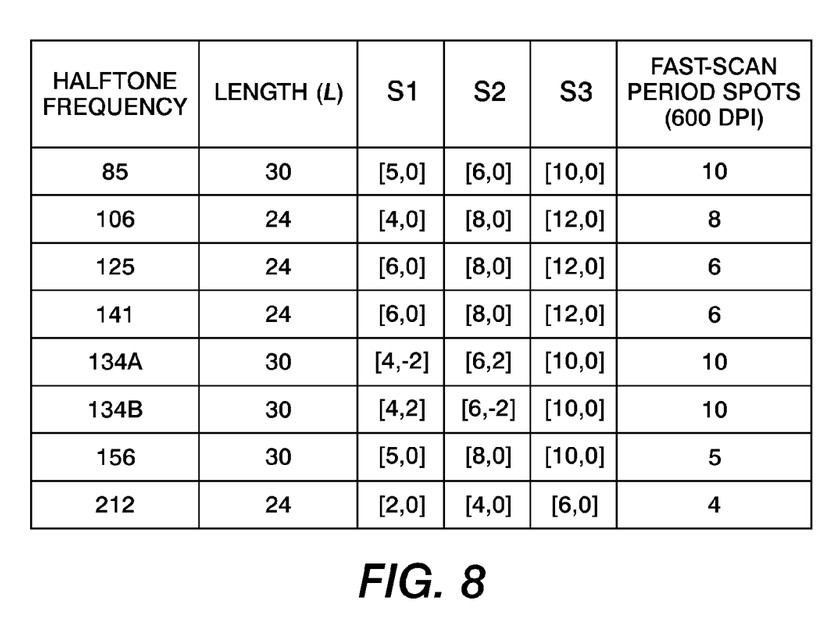
FIG. 8 shows a set of halftone frequencies and the corresponding length and shift parameters used to detect the set of halftone frequencies.

In choosing the length and shift parameters for each halftone frequency that is to be detected, care is taken to select values of the parameters that not only select for one of the halftones, but also discriminate as much as possible against the other halftones to be tested. FIG. 8 shows an example of a set of six different halftones to be detected and a set of length and shift parameters that give good discrimination between the six different halftones.

To make the hardware implementation simpler, several common combinations of length and shift parameter have been merged, although each halftone has a unique combination of the four parameters used in the testing.

For example, the length 30, shift 5 sample periods is used to detect both the 85 and 156 halftone dots. This combination corresponds to a half period of the 85 dot and hence an autocorrelation maximum, but a full period of the 156 dot and therefore an autocorrelation function minimum. It is noted that by using multiple shift parameters, two halftones that are harmonically related can be clearly distinguished. For the example in FIG. 8, the shift parameters chosen give a clear distinction between the 106 and 212 halftone frequencies.

Another advantage of computing the autocorrelation by using an XOR function is that it makes the implementation particularly amenable to a recursive calculation. This minimizes the amount of computation, or if implemented in hardware, gate count, needed to detect the halftone frequency.

As the process shifts from one pixel to the next, one pixel is dropped from the computation window, and one is added. Therefore, the area coverage or autocorrelation function is updated by subtracting the contribution of the dropped pixel and adding the contribution of the added pixel, rather than computing the function over the entire interval again.

Consider the case of a printer that uses a 4× addressability 600 dpi pixel. That is for each 600 dpi pixel, the imaging system writes four sub-pixels, thereby rendering at an effective resolution of 2400×600. Such high addressability systems are quite common, as the high addressability systems allow for finer control of the halftoning process and improved image quality. In such a system, updating a 600 dpi spot means shifting by 4 of the sub-pixels. The area coverage of any particular spot can be written as:

$$AC^{(L)}[n] = \sum_{\vec{k}=n-\lceil L/2 \rceil}^{n-\lceil L/2 \rceil+L-1} p[\vec{k}]$$

$$= \sum_{\vec{k}=n-\lceil L/2 \rceil-4}^{n-\lceil L/2 \rceil+L-5} p[\vec{k}] + \sum_{\vec{k}=n-\lceil L/2 \rceil+L-4}^{n-\lceil L/2 \rceil+L-1} p[\vec{k}] - \sum_{\vec{k}=n-\lceil L/2 \rceil-4}^{n-\lceil L/2 \rceil-1} p[\vec{k}]$$

$$= AC^{(L)}[n-4] + AC_{add} - AC_{sub}$$

That is, the area coverage of the new pixel is equal to the area coverage of the previous pixel plus the addition of the contribution from the pixel that has moved into the window and subtracting the contribution from the pixel that has left the window.

Figure 9:
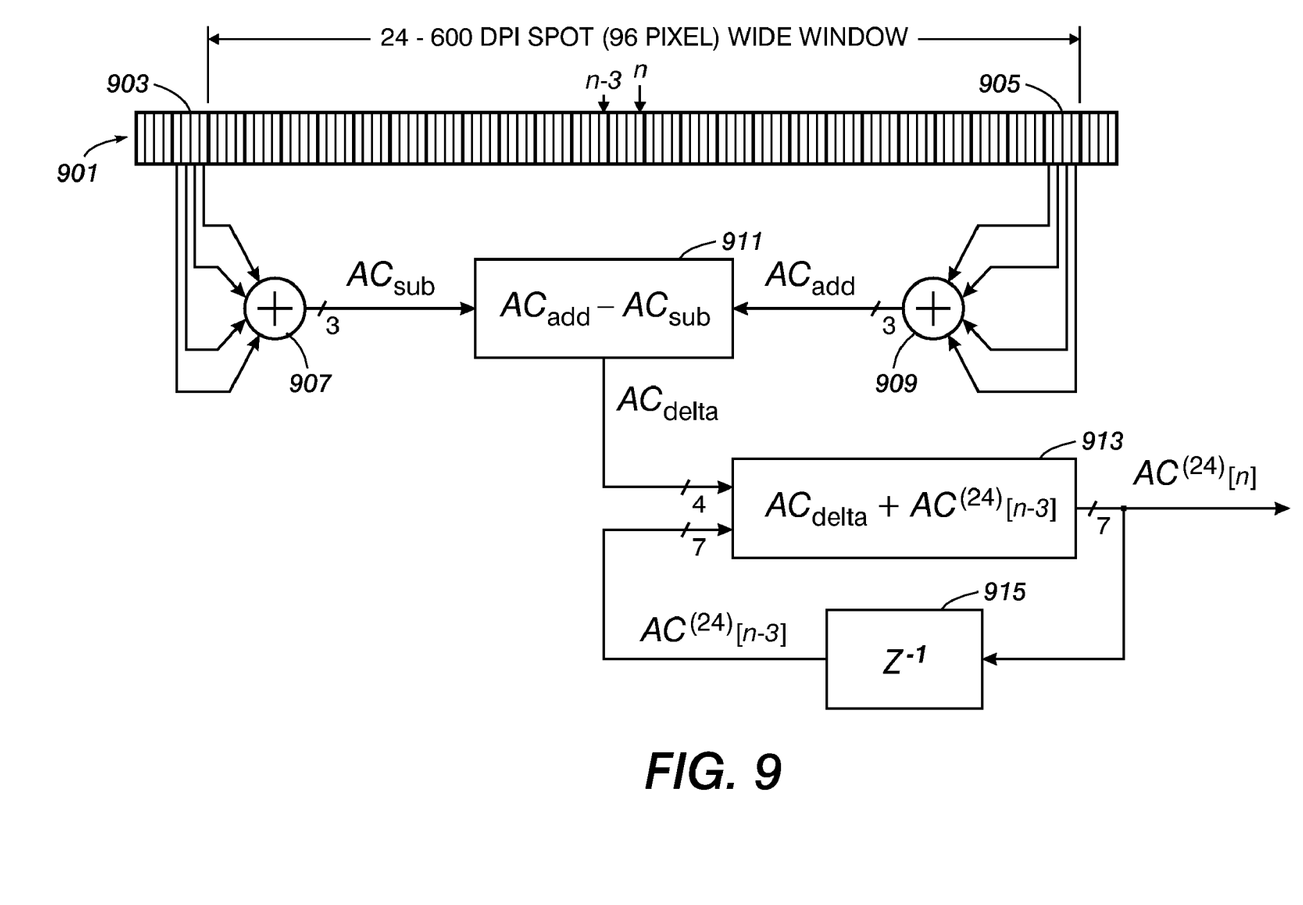
FIG. 9 illustrates a block diagram of a possible hardware implementation of a recursive calculation of the local scan-line area coverage.

FIG. 9 shows a block diagram of a circuit implementation, possibly implemented as part of an application specific integrated chip, that recursively computes the area coverage for a 24×600 dpi pixel window. For purposes of illustration a 4X addressed implementation of the halftone is shown.

Index n points to the first sub pixel of the pixel under test, while index n-3 points to the first subpixel of the previously tested pixel. Pixel 903 corresponds to the first pixel in the scanline 903 that was used to compute the area coverage for the previously tested pixel. Pixel 903 will not be used to compute the area coverage for the current pixel. Pixel 905 is the new pixel that is now part of the window for the area coverage computation. All the pixels after 903 and up to and including 905 are implicitly included in the computation.

Adder 907 adds the four binary values from the subpixels of pixel 903. Similarly, adder 909 adds the four subpixels from pixel 905. The difference between the sum from adder 905 and adder 907 is determined by circuit 911. This difference is the amount that must be added to the area coverage calculation corresponding to the previous pixel to compute the area coverage of the new pixel.

Delay element 915 holds the value of the last output of the area coverage computation. The output of element 915 is fed to adder 913 which adds the previous area coverage to the difference computed in element 911. This circuit implements the recursive computation of the area coverage as outlined in the equation set forth above. Since the recursive nature of the computation, the implementation requires relatively few gates and can be done quickly.

The computation of the autocorrelation function can be similarly performed. Again, as the window shifts from one pixel to the next, the contribution of from one pixel needs to be added, and the contribution of another is subtracted. Mathematically, the autocorrelation function can be written as:

$$X_{S_c}^L[n] = \sum_{c=n-\lceil L/2 \rceil-\lceil S_c/2 \rceil}^{n-\lceil L/2 \rceil-\lceil S_c/2 \rceil+L-1} p[c] \wedge p[c+S_c]$$

$$= \sum_{\vec{k}=n-\lceil L/2 \rceil-\lceil S_c/2 \rceil-4}^{n-\lceil L/2 \rceil-\lceil S_c/2 \rceil+L-5} p[c] \wedge p[c+S_c] +$$

$$\sum_{\vec{k}=n-\lceil L/2 \rceil-\lceil S_c/2 \rceil+L-4}^{n-\lceil L/2 \rceil-\lceil S_c/2 \rceil+L-1} p[c] \wedge p[c+S_c] -$$

$$\sum_{\vec{k}=n-\lceil L/2 \rceil-\lceil S_c/2 \rceil-4}^{n-\lceil L/2 \rceil-\lceil S_c/2 \rceil-1} p[c] \wedge p[c+S_c]$$

$$= X_{S_c}^L[n-4] + X_{S_c}^4[n-\lceil L/2 \rceil+L-2] - X_{S_c}^4[n-\lceil L/2 \rceil-2]$$

$$= X_{S_c}^L[n-4] + X_{add} - X_{sub},$$

Figure 10:
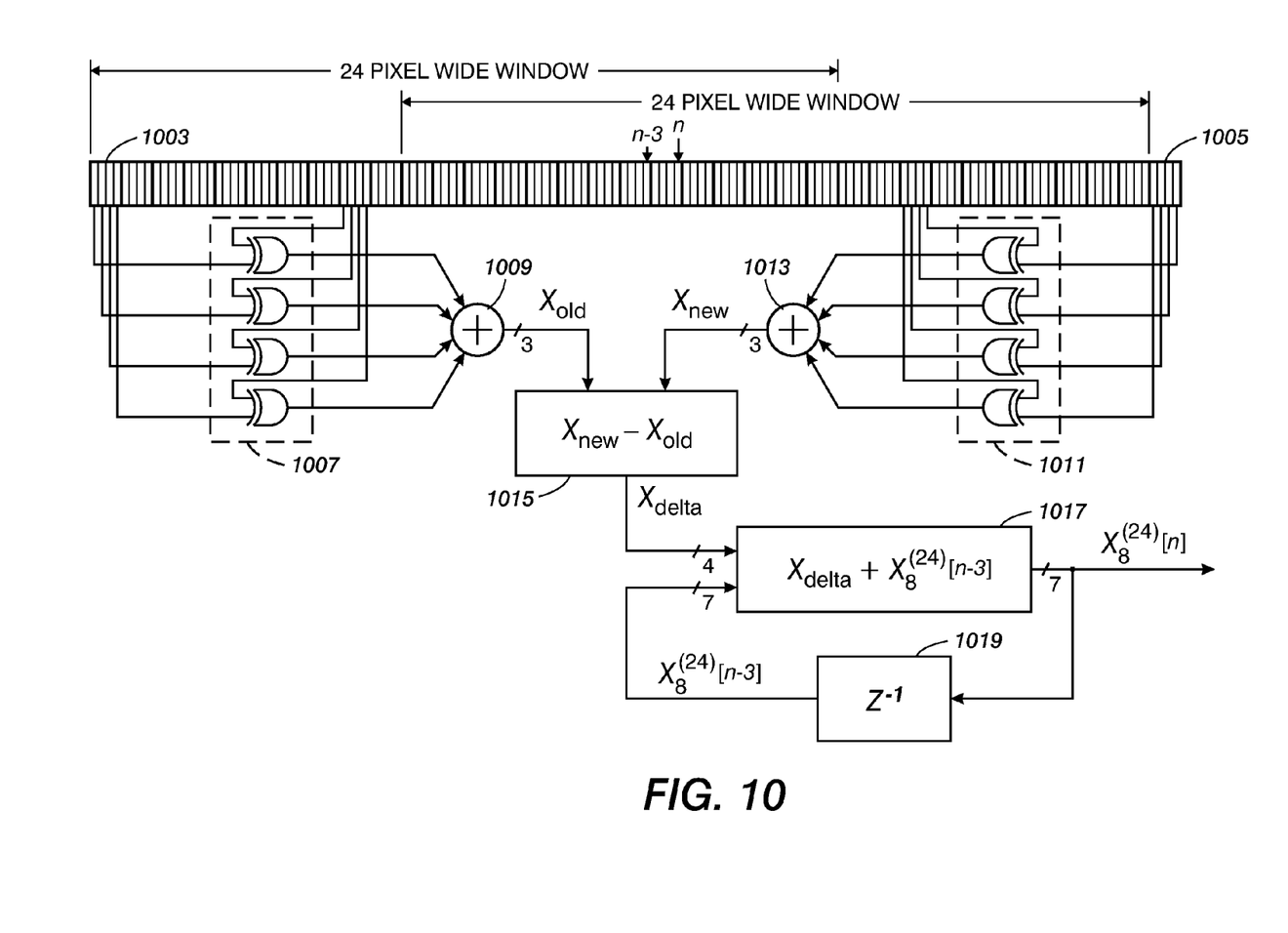
FIG. 10 illustrates a block diagram of a possible hardware implementation of a recursive calculation of the autocorrelation function.

FIG. 10 shows a block diagram of a circuit implementation for computing the autocorrelation function over a 24×600 dpi pixel window. Again, 4× addressability of the halftone is used. The example shown is for a shift factor of 8. Again, the pixel under test is indicated by its first sub-pixel n, while the previously tested pixel is indicated by its first sub-pixel n-3. Pixel 1003 is the pixel that is to be dropped from the autocorrelation computation, while pixel 1005 is the pixel that is being added.

The group of XOR gates, 1007, forms the XOR correlation calculation which includes pixel 1003. The sum of the outputs of the four XOR gates in 1007 is added by summing circuit 1009. Similarly the group of XOR gates 1011 forms the XOR correlation calculation which includes pixel 1005 with the adjacent pixel. The sum of the outputs of the four XOR gates in 1011 is added by summing circuit 1013. The difference between the two adders 1009 and 1013 is the amount by which the previous autocorrelation value must be updated in order to include contributions from pixel 1005 and exclude contributions from pixel 1003. This difference is computed in circuit 1015. The difference is added to the previous value in element 1017, where the delay element 1019 holds the previously computed autocorrelation value.

In summary, a real-time imbedded halftone frequency detection algorithm distinguishes between a series of distinct halftone frequencies of interest. First, a collection of correlation based and local area coverage statistics are computed. The area coverage is used as an index to look-up the expected tone and frequency dependent correlation result. The absolute differences between the expected and measured correlation results are error terms that are weighted and summed and scaled to produce normalized demerit terms; one term for each halftone frequency. The minimum demerit corresponds to a specific halftone frequency. The combination of widths of image data used to compute the correlation and correlation function sampling points (shifts) are chosen to jointly minimize classification error.

Once the entire image has been scanned by the method described above, the tag plane may be used by subsequent processing stages to perform image quality optimizations by using the specific halftone information. For example, the tone response curve (TRC) of the output image may be modified to accommodate the TRC that best matches the halftone being used. In addition, separate text and pictorial adjustments can be supported. Other uses for the specific halftone data will be apparent to those skilled in the art.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of detecting a halftone frequency, comprising:
   (a) receiving a digitized image;
   (b) performing, using a circuit, a series of autocorrelation function calculations on the digitized image to generate autocorrelation function values for each halftone frequency of a predetermined set of possible halftone frequencies;
   (c) looking-up predicted autocorrelation values for the length parameter, the halftone frequency and a first shift parameter, a second shift parameter and a third shift parameter;
   (d) calculating, based upon the difference between the predicted and calculated autocorrelation function values, a demerit term for each possible halftone frequency; and
   (e) selecting a halftone frequency from a predetermined set of possible halftone frequencies based upon the calculated demerit terms.

2. The method as claimed in claim 1, wherein said performing an autocorrelation function on the halftoned image to generate an autocorrelation function value for each halftone frequency of the predetermined set of possible halftone frequencies comprises:
   (b1) defining for each halftone frequency of the set of halftone frequencies as a length parameter, a first shift parameter, a second shift parameter, and a third shift parameter;
   (b2) computing a local area coverage value at a pixel location being tested using the length parameter, and (b3) computing three local autocorrelation function values at the pixel being tested, the three autocorrelation functions being computed using the length parameter and the first shift parameter, the length parameter and the second shift parameter, and the length parameter and the third shift parameter.

3. The method as claimed in claim 2, wherein said performing an autocorrelation function on the digitized image to generate an autocorrelation function value for each halftone frequency of the predetermined set of possible halftone frequencies further comprises:
   (b4) adjusting each of the three local autocorrelation function predicted values based on the local area coverage function value.

4. The method as claimed in claim 3, wherein said calculating, based upon the autocorrelation function value, a demerit term for each possible halftone frequency comprises:
   (d1) comparing each of the three adjusted autocorrelation function values to the predicted autocorrelation function value for each halftone frequency of the predetermined set of possible halftone frequencies to derive the demerit value there from.

5. The method as claimed in claim 1, wherein said calculating, based upon the autocorrelation function value, a demerit term for each possible halftone frequency comprises computing a weighted demerit value.

6. The method as claimed in claim 5, wherein the weighting of the demerit value is tone dependent.

7. The method as claimed in claim 1, further comprising:
   (f) generating a tag value which identifies the pixel being tested as being halftoned at the selected halftone frequency if the demerit value is less than an area coverage dependent threshold value for the selected halftone frequency.

8. The method as claimed in claim 7, further comprising:
   (f1) generating a tag value which identifies the pixel being tested as being text if the demerit value is greater than an area coverage dependent threshold value.

9. The method as claimed in claim 1, wherein the length parameter, the first shift parameter, the second shift parameter, and the third shift parameter are chosen to maximize the difference between the demerit values for each of the halftone frequencies.

10. The method as claimed in claim 1, wherein the autocorrelation function is computed using an XOR calculation.

11. The method as claimed in claim 1, wherein the selected halftone frequency is used to modify the tone response of an attached printing device.

12. A system for detecting a halftone frequency, comprising:
    an autocorrelation function circuit to perform autocorrelation functions upon a digitized image to generate a set of autocorrelation function values for each halftone frequency of a predetermined set of possible halftone frequencies;
    an expected autocorrelation function value circuit to provide a set of expected autocorrelation function values for each halftone frequency of a predetermined set of possible halftone frequencies;
    a demerit calculation circuit, operatively connected to said autocorrelation function circuit and said expected autocorrelation function value circuit, to calculate, based upon the set of autocorrelation function values and the set of expected autocorrelation function values, a demerit term for each possible halftone frequency; and
    a halftone frequency selection circuit, operatively connected to said demerit calculation circuit, to select a halftone frequency from a predetermined set of possible halftone frequencies based upon the calculated demerit terms.

13. The system as claimed in claim 12, further comprising:
    a local area coverage value circuit to compute a local area coverage value at a pixel location being tested.

14. The system as claimed in claim 12, wherein said autocorrelation function circuit computes three local autocorrelation function values at the pixel being tested.

15. The system as claimed in claim 12, wherein said demerit calculation circuit determines an absolute difference between each local autocorrelation function value and the expected autocorrelation function value associated therewith and sums the determined absolute differences to calculate the demerit term.

16. The system as claimed in claim 15, wherein said demerit calculation circuit weights the demerit term, and wherein the weighting of the demerit value is tone dependent.

17. The system as claimed in claim 12, wherein said halftone frequency selection circuit sums all demerit terms associated with a halftone frequency and generated from image data in a predetermined number of scanlines and selects the halftone frequency from a predetermined set of possible halftone frequencies based upon the summed demerit terms.

18. The system as claimed in claim 12, wherein the scanlines are consecutive scanlines.

19. The system as claimed in claim 12, wherein said expected autocorrelation function value circuit is a lookup table indexed by a local area coverage associated with the pixel being tested.

20. The system as claimed in claim 12, wherein said local area coverage value circuit computes a local area coverage value at a pixel location being tested using a recursive calculation.

21. The system as claimed in claim 12, further comprising:
a tag generation circuit to generate a tag value which identifies the pixel being tested as being halftoned at the selected halftone frequency if the demerit value is less than an area coverage dependent threshold value for the selected halftone frequency or a tag value which identifies the pixel being tested as being text/line-art if the demerit value is greater less than an area coverage dependent threshold value for the selected halftone frequency.

22. The system as claimed in claim 12 further comprising:
a tone adjustment circuit connected to the halftone frequency selection circuit that uses the selected halftone value to alter the tone reproduction characteristics of an attached printing device.

* * * * *